UNITED STATES PATENT OFFICE 2,012,779

CHROMIFEROUS AZO-DYESTUFF AND PROCESS OF MAKING SAME

Fritz Straub, Basel, and Hermann Schneider, Riehen, near Basel, Switzerland, assignors to Society of Chemical Industry in Basle, Basel, Switzerland No Drawing. Application March 19, 1934, Serial No. 716,427. In Switzerland March 31, 1933

18 Claims. (Cl. 260—12)

This invention relates to the manufacture of chromiferous azo-dyestuffs from mixtures of chromed and chromable azo-dyestuffs which mixtures contain at least one dyestuff of the general formula

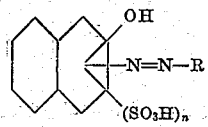

wherein the hydroxyl- and the azo-group are in ortho-position to each other and wherein $n$ equals 1 to 3 and R equals a naphthol radical by heating the mixture in an aqueous medium with an alkali-forming metal salt which, in aqueous solution, is at the most slightly hydrolyzed.

The mixture of chromed and chromable dyestuffs to be used in this invention as the parent material must merely fulfill the condition that it contains a dyestuff of the above general formula which may or may not contain chromium which, further, may be present as a mixed chromium compound with any other azo-dyestuff and may, for example, be obtained from diazotized 1-amino-2-hydroxynaphthalene-4-sulfonic acid or 2-amino-1-hydroxynaphthalene-4-sulfonic acid or from 2-amino-1-hydroxynaphthalene-4,8-disulfonic acid or 2-amino-1-hydroxynaphthalene-4,6-disulfonic acid by coupling the acid with 1- or 2-hydroxynaphthalenes and the substitution products thereof, such as chlorohydroxynaphthalenes, bromohydroxynaphthalenes, methylhydroxynaphthalenes and alkoxyhydroxynaphthalenes. In addition the mixture may contain various chromed and chromable mono-, dis- or poly-azo-dyestuffs; these may be obtained, for example, from diazotized aromatic amines of the benzene or naphthalene series and any coupling components, for example arylamines, phenols or compounds in which the carbon atom capable of coupling belongs to a heterocycle ring or to an open chain; coupling components of which the coupling carbon atom belongs to a heterocyclic ring are, for example, pyrazolones, hydroxyquinolines and barbituric acids, whereas acetoacetic acid derivatives and benzoyl acetic orthocarboxylic acids are coupling components, the coupling carbon atom of which belongs to an open chain.

The chromed azo-dyestuffs which are contained in the mixture may be produced by chroming the azo-dyestuff by various known methods and with various chroming agents; such processes are, for example, chroming by means of agents which yield chromium in acid, neutral or alkaline medium in an open vessel or under pressure, in presence or absence of a suitable addition such as, for example, an inorganic or an organic acid, or a soluble salt thereof, or another substance such as an organic solvent.

The mixture to be used for the process may contain only one chromed azo-dyestuff and only one chromable azo-dyestuff, or only one chromed azo-dyestuff and two or more chromable azo-dyestuffs or two or more chromed azo-dyestuffs and only one chromable azo-dyestuff, or two or more chromed azo-dyestuffs and two or more chromable azo-dyestuffs.

Furthermore the chromed azo-dyestuffs in the mixture may be derived from the same chromable azo-dyestuffs present in the mixture or they may be different from these chromable dyestuffs.

The proportion of the chromed azo-dyestuffs to the chromable azo-dyestuffs in the mixture may vary within wide limits; moreover, there may be used for the process a mixture which has been obtained not from isolated chromed dyestuffs but by using chroming solutions or suspensions which, if desired, may be neutralized.

The mixture of chromed and chromable azo-dyestuffs may be heated in an aqueous medium which, in addition to water, may contain an organic solvent or suspension agent which is miscible with water, for example, an alcohol, in addition to an alkali-forming metal salt such as the sodium, potassium or ammonium salt of an inorganic, aliphatic or aromatic acid which is at the most feebly hydrolyzed in aqueous solution and the heating may occur in an open vessel or under pressure or even in the dye-bath. Alkali-forming metal salts which are at the most feebly hydrolyzed in aqueous solution are for example sodium chloride, sodium and potassium sulfates, sodium acetate, sodium formate, sodium benzene sulfonate, sodium naphthalene sulfonates, ammonium sulfate, magnesium sulfate, ammonium acetate and sodium benzoate.

Particularly valuable dyestuffs are produced when a chromium compound of the dyestuff of the aforesaid general formula is used and the said dyestuff in unchromed condition, for in this manner dyestuffs dyeing navy blue are obtained which, as contrasted with the dyestuffs of this group hitherto known as dyeing similar tints, are uniform in dyeing deep tints and are fast in every respect.

The chromium compounds obtainable by the invention are characterized by very good solubility in water suitable for dyeing animal fibres and particularly wool and indeed are advantageously dyed by the process described in Patent 1,903,884 or from dye-baths containing an aromatic acid besides an inorganic acid; they dye very varied tints and the dyeings are very fast.

The following examples illustrate the invention, the parts being by weight:—

Example 1

41.6 parts of the azo-dyestuff of the formula

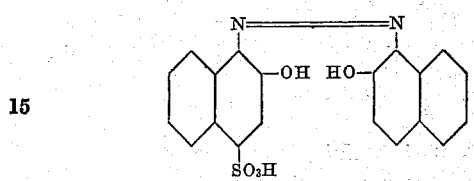

from diazotized 1-amino-2-hydroxynaphthalene-4-sulfonic acid and 2-hydroxynaphthalene are mixed in aqueous solution with a quantity of chromium formate corresponding with 8 parts of $Cr_2O_3$ and the mixture is heated to boiling for 10–12 hours in a reflux apparatus while stirring.

The filtered chromium compound of the dyestuff is suspended in 800 parts of water and there are added 20.8 parts of the azo-dyestuff from diazotized 1-amino-2-hydroxynaphthalene-4-sulfonic acid and 2-hydroxynaphthalene together with 20 parts of calcined sodium sulfate while stirring and the whole is then boiled for 12–15 hours in a reflux apparatus. The mass which, for the greater part, remains undissolved is now dissolved by adding 75 parts of caustic soda lye of 30 per cent strength and the chromed dyestuff is separated by addition of common salt and neutralization with hydrochloric acid of 10 per cent strength. It is filtered and dried. It dyes wool in a bath acid with an organic acid and sulfuric acid navy blue tints of very good fastness, particularly good fastness to rubbing, and excellent color in the artificial light.

A chromiferous dyestuff with similar dyeing properties is obtained by treating the chromed dyestuff from diazotized 1-amino-2-hydroxynaphthalene-4-sulfonic acid and 1-hydroxynaphthalene with the unchromed azo-dyestuff from diazotized 1-amino-2-hydroxynaphthalene-4-sulfonic acid and 1-hydroxynaphthalene, or the chromed dyestuff from diazotized 1-amino-2-hydroxynaphthalene-4-sulfonic acid and 2-hydroxynaphthalene with the unchromed azo-dyestuff from diazotized 1-amino-2-hydroxynaphthalene-4-sulfonic acid and 1-hydroxynaphthalene in the manner described in the second paragraph of this example.

Example 2

The separated chromed dyestuff, obtained by boiling for 12 hours a mixture of 41.6 parts of the azo-dyestuff from diazotized 1-amino-2-hydroxynaphthalene-4-sulfonic acid and 2-hydroxynaphthalene with a chromium formate solution, corresponding with 8 parts of $Cr_2O_3$, is stirred in the form of a moist paste with 41.6 parts of the azo-dyestuff from diazotized 1-amino-2-hydroxynaphthalene-4-sulfonic acid and 2-hydroxynaphthalene in 800 parts of water and after addition of 25 parts of crystallized sodium acetate the whole is boiled for 12 hours in a reflux apparatus. The blue solution thus obtained is filtered and the filtrate is evaporated to dryness in a vacuum on the water bath.

The new chromium compound dissolves very easily in water to a blackish blue solution and dyes wool in a bath acid with organic acid and sulfuric acid navy blue tints of very good fastness.

Example 3

30 parts of a chromium compound obtained in alkaline medium of the dyestuff of the formula

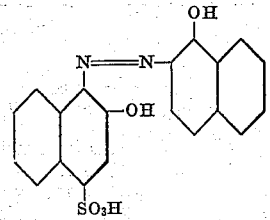

from diazotized 1-amino-2-hydroxynaphthalene-4-sulfonic acid and 1-hydroxynaphthalene, which compound contains one atom of chromium for one molecule of the dyestuff, are dissolved in 600 parts of hot water together with 7.5 parts of the azo-dyestuff of the formula

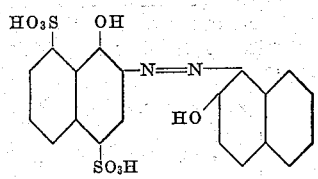

from diazotized 2-amino-1-hydroxynaphthalene-4,8-disulfonic acid and 2-hydroxynaphthalene. There are added 7 parts of calcined sodium sulfate and boiling is continued for a long time in a reflux apparatus. The blue solution of the new chromium compound thus obtained is filtered and the filtrate evaporated to dryness on the water bath in a vacuum; the chromium compound is a violetish black powder soluble in water to a blue solution, in caustic soda lye of 10 per cent strength to a violet solution and in concentrated sulfuric acid to a blackish blue-green solution. The new chromiferous dyestuff dyes wool and silk in an acid bath blue tints of excellent properties of fastness.

Example 4

60 parts of a chromium compound produced in alkaline medium of the dyestuff of the formula

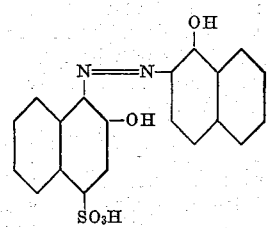

from diazotized 1-amino-2-hydroxynaphthalene-4-sulfonic acid and 1-hydroxynaphthalene are dissolved in 1200 parts of hot water together with 12 parts of the dyestuff of the formula

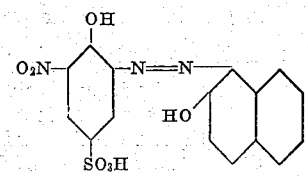

from diazotized 6-nitro-2-amino-1-phenol-4-sulfonic acid and 2-hydroxynaphthalene. There are added 20 parts of crystallized sodium acetate and the whole is boiled for a long time in a reflux apparatus. After filtering the blackish blue solution to separate small quantities of impurities the filtrate is evaporated to dryness on the water bath in a vacuum. The chromiferous dyestuff thus obtained dissolves very easily in water and caustic soda lye of 10 per cent strength to blackish blue solutions having strong red dichroism; in concentrated sulfuric acid it dissolves to a grey-blue solution. It dyes wool and silk in an acid bath excellent fast blackish navy blue tints.

*Example 5*

A solution containing 30.3 parts of a chromium compound produced in alkaline medium of the dyestuff of the formula

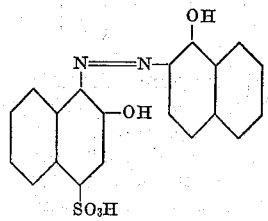

from diazotized 1-amino-2-hydroxynaphthalene-4-sulfonic acid and 1-hydroxynaphthalene, 19.1 parts of the dyestuff of the formula

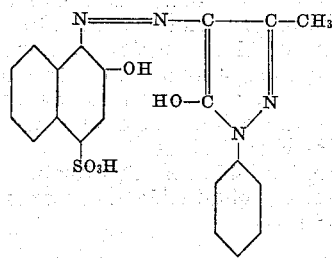

from diazotized 1-amino-2-hydroxynaphthalene-4-sulfonic acid and 1-phenyl-3-methyl-5-pyrazolone and 11.9 parts of sodium benzoate in 1000 parts of water is heated in a pressure vessel for 4 hours at 120–125° C. After cooling the new chromiferous dyestuff is completely dissolved by addition of caustic soda lye, the solution is filtered from impurities and the filtrate is neutralized with dilute acid and evaporated to dryness in a vacuum. The dyestuff thus obtained is a black powder which dissolves in water, dilute sodium carbonate solution and dilute caustic soda lye to violet solutions and in concentrated sulfuric acid to brown-violet-black solutions. It dyes wool in a bath acid with organic acid and sulfuric acid brown-violet tints.

*Example 6*

In 400 parts of water there are dissolved 35.8 parts of the chromiferous dyestuff which has been obtained by chroming in common in acid medium equal parts of the dyestuff from diazotized 1-amino-2-hydroxynaphthalene-4-sulfonic acid and 2-hydroxynaphthalene and the dyestuff from diazotized 1-amino-2-hydroxynaphthalene-4-sulfonic acid and 1-hydroxynaphthalene together with 11.1 parts of sodium formate; this solution is heated for several hours together with the solution of 15.4 parts of the dyestuff from nitrated 1-diazo-2-hydroxynaphthalene-4-sulfonic acid and 2-hydroxynaphthalene in 400 parts of water, the evaporated water being made good. The whole is now cooled to 40–45° C. and the new chromiferous dyestuff is completely dissolved by addition of caustic soda lye and the solution filtered from impurities. The filtrate is neutralized with dilute acid and evaporated to dryness in a vacuum. The dyestuff thus obtained is a violet-black powder of bronze appearance which dissolves in water and in dilute sodium carbonate solution to a blackish blue-violet solution, in dilute caustic soda lye to a blackish red-violet solution and in concentrated sulfuric acid to a blackish blue solution. It dyes wool in a bath acid with organic acid and sulfuric acid navy blue tints of good properties of fastness.

*Example 7*

In 200 parts of water there are dissolved 14.6 parts of the chromiferous dyestuff, obtained by chroming in common in an acid medium equal parts of the dyestuff from diazotized 1-amino-2-hydroxynaphthalene-4-sulfonic acid and 2-hydroxynaphthalene and the dyestuff from diazotized 1-amino-2-hydroxynaphthalene-4-sulfonic acid and 1-hydroxynaphthalene, and 4.8 parts of sodium benzene sulfonate. This solution is heated for several hours with a solution of 10.3 parts of the dyestuff from nitrated 1-diazo-2-hydroxynaphthalene-4-sulfonic acid and 1-hydroxynaphthalene in 200 parts of water, the evaporated water being made good. The whole is cooled to 40–45° C., the new chromiferous dyestuff is completely dissolved by the addition of caustic soda lye. The solution is filtered from impurities and the filtrate is neutralized with dilute acid and evaporated to dryness in a vacuum. The dyestuff thus obtained is a violet-black powder of bronze appearance which dissolves in water to a black-blue solution, in dilute sodium carbonate solution to a blackish violet solution, in dilute caustic soda lye to a blackish red-violet solution and in concentrated sulfuric acid to a greenish blue-black solution. It dyes wool in a bath acid with organic acid and sulfuric acid greenish navy blue tints.

*Example 8*

In 200 parts of water there are dissolved 15.1 parts of the chromiferous dyestuff obtained by chroming in common in an acid medium equal parts of the dyestuff from diazotized 1-amino-2-hydroxynaphthalene-4-sulfonic acid and 2-hydroxynaphthalene and the dyestuff from diazotized 1-amino-2-hydroxynaphthalene-4-sulfonic acid and 1-hydroxynaphthalene and 6.35 parts of sodium α-naphthalene sulfonate. This solution is heated together with a solution of 10.65 parts of the dyestuff from diazotized 1-amino-2-hydroxynaphthalene-4-sulfonic acid and 1-hydroxynaphthalene-8-sulfamide in 200 parts of water for several hours, the evaporated water being made good. The whole is now cooled to 40–45° C., the new chromiferous dyestuff is completely dissolved by addition of caustic soda lye. The solution is filtered from impurities and the filtrate neutralized with dilute acid and evaporated to dryness in a vacuum. The dyestuff thus obtained is a violet-black powder, soluble in water and dilute sodium carbonate solution to a blue solution, in dilute caustic soda lye to a violet solution and in concentrated sulfuric acid to a greenish blue-black solution. It dyes wool in a bath acid with organic acid and sulfuric acid pure blue tints.

*Example 9*

In 400 parts of water are dissolved 33 parts of the chromiferous dyestuff, obtained by chroming in common in acid medium equal parts of the dyestuff from diazotized 1-amino-2-hydroxynaphthalene-4-sulfonic acid and 2-hydroxynaphthalene and the dyestuff from diazotized 1-amino-2-hydroxynaphthalene-4-sulfonic acid and 1-hydroxynaphthalene and 5.2 parts of common salt. This solution is heated with a solution of 19.8 parts of the dyestuff of the formula

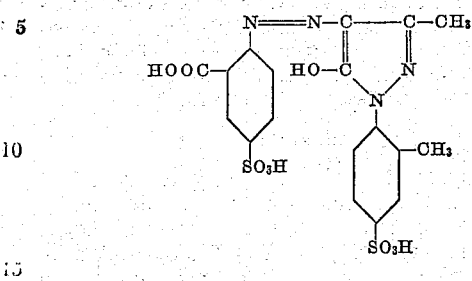

from diazotized 1-amino-4-sulfobenzene-2-carboxylic acid and 1-(2'-methyl-4'-sulfo)-phenyl-3-methyl-5-pyrazolone in 400 parts of water for several hours the evaporated water being made good. The whole is cooled to 40–45° C., the new chromiferous dyestuff is dissolved completely by the addition of caustic soda lye. The solution is filtered from impurities and the filtrate is neutralized with dilute acid and evaporated in a vacuum to dryness. The dyestuff thus obtained is a black powder soluble in water and in dilute sodium carbonate solution to olive-black solutions, in dilute caustic soda solution to a blackish red-violet solution and in concentrated sulfuric acid to a yellowish green solution. It dyes wool in a bath acid with organic acid and sulfuric acid dark green tints.

*Example 10*

In 800 parts of water are dissolved 31.9 parts of the chromiferous dyestuff, obtained by chroming in common in acid medium equal parts of the dyestuff from diazotized 1-amino-2-hydroxynaphthalene-4-sulfonic acid and 2-hydroxynaphthalene and the dyestuff from diazotized 1-amino-2-hydroxynaphthalene-4-sulfonic acid and 1-hydroxynaphthalene, and 17.8 parts of the dyestuff of the formula

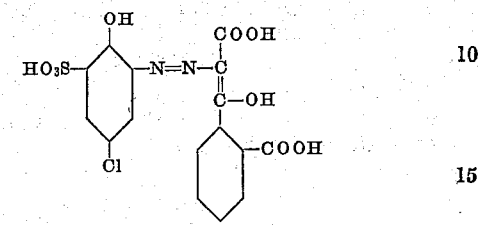

obtainable by coupling diazotized 4-chloro-2-amino-1-phenol-6-sulfonic acid with benzoyl acetic ortho-carboxylic acid, 13 parts of sodium lactate are added to the solution and the whole is boiled for several hours in a reflux apparatus. When no more unchromed dyestuff is to be detected the solution is filtered from impurities and evaporated in a vacuum to dryness. There is obtained a new chromiferous dyestuff in the form of a black powder which dissolves in water and in dilute sodium carbonate solution to a blackish blue solution, in dilute caustic soda lye to a blackish violet solution and in concentrated sulfuric acid to a blue-black solution. It dyes wool in a bath acid with organic acid and sulfuric acid blue tints of good fastness.

The following table contains further examples of the dyestuffs obtainable in accordance with this invention:—

| No. | Chromium compound of the azo-dyestuff | | Azo-dyestuff | | Alkali-forming metal salt | Dyeing on wool |
|---|---|---|---|---|---|---|
| | Parts | Formula | Parts | Formula | | |
| 1 | 38,5 | [naphthalene-N=N-naphthalene with OH, OH, SO₃H] | 13.2 | [naphthalene-N=N-naphthalene with OH, HO, NO₂, SO₃H] | Sodium formate | Black-blue. |
| 2 | 33 | ----do---- | 17.6 | [structure with OH, N=N, OH, NO₂, SO₃H] | Sodium benzene-sulfonate | Navy blue. |
| 3 | 15,1 | ----do---- | 16.6 | [structure with OH, SO₂NH₂, N=N, OH, SO₃H] | Sodium α-naphthalene sulfonate | Do. |
| 4 | 44 | ----do---- | 7.1 | [structure with HO₃S, N=N, OH, Cl, COOH] | Magnesium sulfate | Dark green. |
| 5 | 66 | ----do---- | 28.6 | [structure with N=N, OH, HO, CH₃, SO₃H] | Ammonium acetate | Reddish navy blue. |

| No. | Chromium compound of the azo-dyestuff | | Azo-dyestuff | | Alkali-forming metal salt | Dyeing on wool |
|---|---|---|---|---|---|---|
| | Parts | Formula | Parts | Formula | | |
| 6 | 20.6 | [structure: bis-naphthol azo with SO₃H] | 6.58 | [structure with COOH, OH, SO₃H] | Sodium sulfate | Navy blue. |
| 7 | 30.2 | ...do... | 19 | [structure with pyrazolone, SO₃H, phenyl] | Sodium benzoate | Brown-violet. |
| 8 | 19.8 | ...do... | 5.9 | [structure with OH, HO₃S, NO₂, CONH-phenyl, CH₃, C-OH] | Potassium chloride | Black-olive. |
| 9 | 27.5 | ...do... | 24.8 | [structure with HOOC, SO₃H, pyrazolone, CH₃, SO₃H] | Sodium chloride | Yellow-olive. |
| 10 | 16.5 | [structure: naphthol azo with OH, SO₃H] | 7.15 | [structure with OH, COOH, CH₃, SO₃H] | Ammonium acetate | Reddish blue. |
| 11 | 20.6 | ...do... | 6.58 | [structure with COOH, OH, SO₃H] | Sodium sulfate | Navy blue. |
| 12 | 38.6 | ...do... | 12.7 | [structure with pyrazolone, SO₃H, phenyl] | Sodium benzoate | Violet. |
| 13 | 16.5 | ...do... | 8.8 | [structure with OH, OH, NO₂, SO₃H] | Sodium benzene sulfonate | Grey-blue. |
| 14 | 39.6 | ...do... | 11.8 | [structure with OH, NO₂, CH₃, C-OH, CONH-phenyl] | Potassium chloride | Olive. |

| No. | Chromium compound of the azo-dyestuff | | Azo-dyestuff | | Alkali-forming metal salt | Dyeing on wool |
|---|---|---|---|---|---|---|
| | Parts | Formula | Parts | Formula | | |
| 15 | 22 | 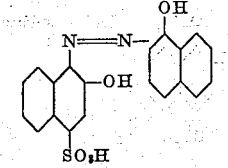 | 3.56 | 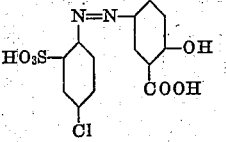 | Magnesium sulfate | Greenish-blue. |
| 16 | 18.7 | 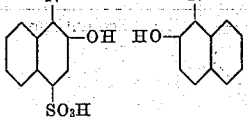 | 6.75 | 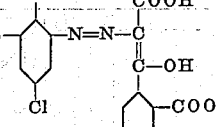 | Sodium lactate | Greenish-blue. |
| 17 | 35.7 | do | 19.15 | 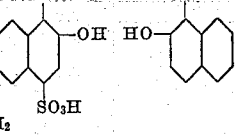 | Ammonium acetate | Grey-blue. |
| 18 | 35.7 | 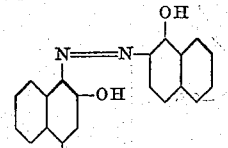 | 19.15 | do | do | Do. |
| 19 | 13.75 | do | 12.4 | 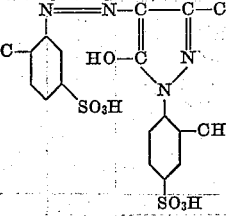 | Sodium chloride | Yellow olive. |
| 20 | 18.7 | do | 6.75 | 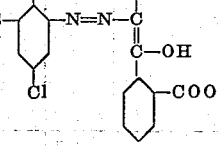 | Sodium lactate | Green-blue. |
| 21 | 36 | 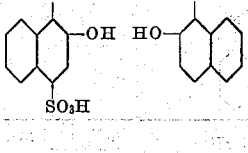 | 17.6 | 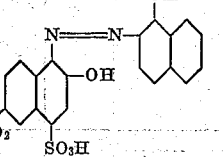 | Sodium benzene mono-sulfonate. | Green-black. |
| 22 | 20.6 | do | 4.54 | 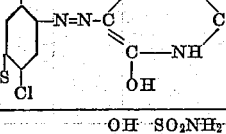 | Sodium formate | Blue. |
| 23 | 33 | 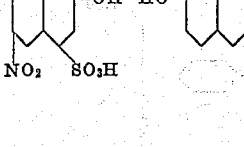 | 21.3 | 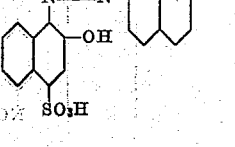 | Sodium α-naphthalene mono-sulfonate. | Green-black. |

| No. | Chromium compound of the azo-dyestuff | | Azo-dyestuff | | Alkali-forming metal salt | Dyeing on wool |
|---|---|---|---|---|---|---|
| | Parts | Formula | Parts | Formula | | |
| 24 | 16.5 + 16.5 | [naphthalene-N=N-naphthalene with OH, HO, SO₃H groups] + [second naphthalene azo structure with OH, OH, SO₃H] | 14.3 | [naphthalene-N=N-naphthalene with OH, HO, CH₃, SO₃H] | Ammonium acetate. | Reddish blue. |
| 25 | 30.3 | [naphthalene-N=N-naphthalene with OH, HO, SO₃H] | 17.7 | [naphthalene structure with OH, N=N, HO, SO₃H] | Potassium oxalate. | Reddish navy blue. |
| 26 | 15.1 | [naphthalene-N=N-naphthalene with OH, HO, SO₃H] | 9.9 | [naphthalene-N=N-naphthalene with OH, HO, NO₂, SO₃H] | Sodium formate. | Navy blue. |
| 27 | 30.3 | [naphthalene N=N naphthalene with OH, OH, SO₃H] | 21.4 | [naphthalene N=N naphthalene with OH, SO₂NH₂, OH, SO₃H] | Sodium α-naphthalene monosulfonate. | Blue. |
| 28 | 28.6 | [naphthalene-N=N-naphthalene with OH, HO, SO₃H] | 9.45 + 8.6 | [naphthalene N=N naphthalene with OH, OH, SO₃H] + [naphthalene-N=N-naphthalene with OH, HO, CH₃, SO₃H] | Sodium acetate. | Red-blue. |
| 29 | 8 + 9.9 | [naphthalene-N=N-naphthalene with OH, HO, SO₃H] + [naphthalene N=N naphthalene with OH, OH, SO₃H] | 9.6 | [naphthalene-N=N-naphthalene with OH, HO, HN-CH₂-SO₃H, SO₃H] | Ammonium acetate. | Blackish-blue. |

| No. | Chromium compound of the azo-dyestuff | | Azo-dyestuff | | Alkali-forming metal salt | Dyeing on wool |
|---|---|---|---|---|---|---|
| | Parts | Formula | Parts | Formula | | |
| 30 | 15.7<br><br>12.9 | 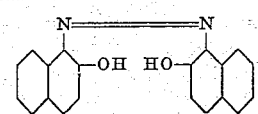 | 20.3 | 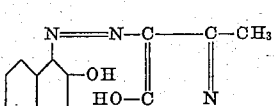 | Sodium benzoate | Violet. |
| 31 | 9.1<br><br>7.45 | 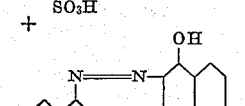 | 10.5 | 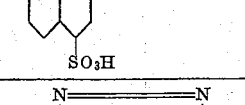 | Sodium sulfate | Navy blue. |
| 32 | 11.9<br><br>17.8 | 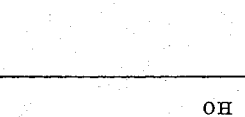 | 19.4 | 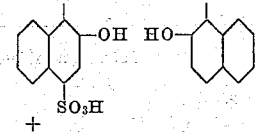 | Potassium chloride. | Blackish-olive-green. |
| 33 | 8.25<br><br>8.25 | 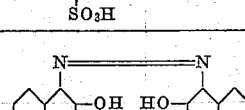 | 7.13 | 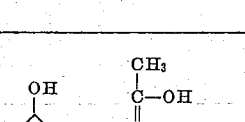 | Magnesium sulfate. | Blue-green. |
| 34 | 33 | 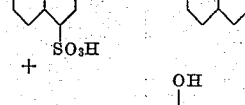 | 12.6 | 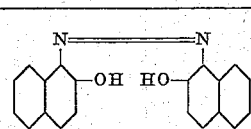 | Sodium acetate | Navy blue. |
| 35 | 33 | 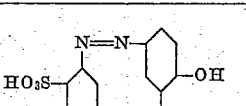 | 12.6 | _____do_____ | _____do_____ | Do |

| No. | Chromium compound of the azo-dyestuff | | Azo-dyestuff | | Alkali-forming metal salt | Dyeing on wool |
|---|---|---|---|---|---|---|
| | Parts | Formula | Parts | Formula | | |
| 36 | 14.05 | 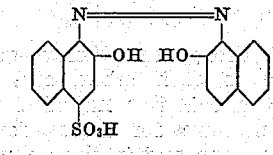 | 15.4 | 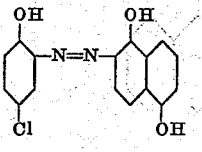 | Sodium acetate | Navy blue. |
| | 14.05 | + 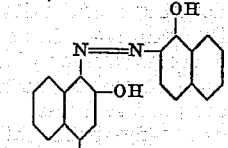 | | | | |

What we claim is:—

1. Process for the manufacture of chromiferous azo-dyestuffs from mixtures of chromed azo-dyestuffs and chromable azo-dyestuffs which mixtures contain at least one dyestuff of the general formula:

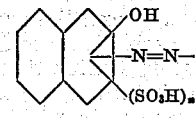

wherein the hydroxyl- and the azo-group are in ortho-position to each other, and wherein $n$ equals 1 to 3, and R is a naphthol radical, consisting in boiling these mixtures for at least four hours in an aqueous medium and in the absence of free acids with alkali-forming metal salts which are at the most slightly hydrolyzed in aqueous solution.

2. Process for the manufacture of chromiferous azo-dyestuffs from mixtures of chromed azo-dyestuffs and chromable azo-dyestuffs which mixtures contain at least one chromium compound of an azo-dyestuff of the general formula

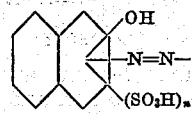

wherein the hydroxyl- and the azo-group are in ortho-position to each other, and wherein $n$ equals 1 to 3, and R is a naphthol radical, consisting in boiling these mixtures for at least four hours in an aqueous medium and in the absence of free acids with alkali-forming metal salts which are at the most slightly hydrolyzed in aqueous solution.

3. Process for the manufacture of chromiferous azo-dyestuffs from mixtures of chromed azo-dyestuffs and chromable azo-dyestuffs which mixtures contain at least one chromium compound of an azo-dyestuff of the general formula

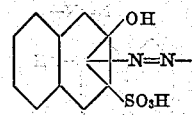

wherein the hydroxyl- and the azo-group are in ortho-position to each other, and wherein R is a naphthol radical, consisting in boiling these mixtures for at least four hours in an aqueous medium and in the absence of free acids with alkali-forming metal salts which are at the most slightly hydrolyzed in aqueous solution.

4. Process for the manufacture of chromiferous azo-dyestuffs from mixtures of chromed azo-dyestuffs and chromable azo-dyestuffs which mixtures contain a chromium compound of an azo-dyestuff of the general formula

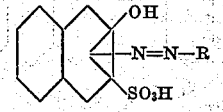

wherein the hydroxyl- and the azo-group are in ortho-position to each other, and wherein R is a naphthol radical, consisting in boiling these mixtures for at least four hours in an aqueous medium and in the absence of free acids with alkali-forming metal salts which are at the most slightly hydrolyzed in aqueous solution.

5. Process for the manufacture of chromiferous azo-dyestuffs from mixtures of chromed azo-dyestuffs and chromable azo-dyestuffs which mixtures contain at least one dyestuff of the general formula

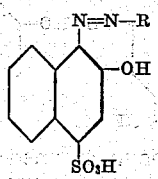

wherein R is a naphthol radical, consisting in boiling these mixtures for at least four hours in an aqueous medium and in the absence of free acids with alkali-forming metal salts which are at the most slightly hydrolyzed in aqueous solution.

6. Process for the manufacture of chromiferous azo-dyestuffs from mixtures of chromed azo-dyestuffs and chromable azo-dyestuffs which mixtures contain a chromium compound of the azo-dyestuff of the formula

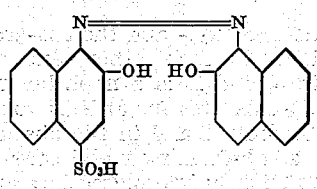

consisting in boiling these mixtures for at least four hours in an aqueous medium and in the absence of free acids with alkali-forming metal salts which are at the most slightly hydrolyzed in aqueous solution.

7. Process for the manufacture of chromiferous azo-dyestuffs from mixtures of chromed azo-dyestuffs and chromable azo-dyestuffs which mixtures contain a chromium compound of the azo-dyestuff of the formula

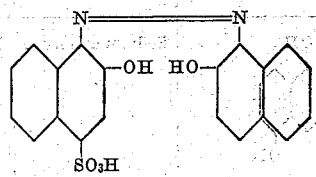

as well as the same unchromed azo-dyestuff, consisting in boiling these mixtures for at least four hours in an aqueous medium and in the absence of free acids with alkali-forming metal salts which are at the most slightly hydrolyzed in aqueous solution.

8. Process for the manufacture of chromiferous azo-dyestuffs from mixtures of chromed azo-dyestuffs and chromable azo-dyestuffs which mixtures contain a chromium compound of the azo-dyestuff of the formula

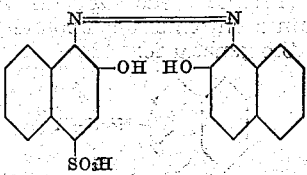

as well as the same unchromed azo-dyestuff, consisting in boiling these mixtures for at least four hours in an aqueous medium and in the absence of free acids with an alkali-forming metal salt of an aliphatic acid.

9. Process for the manufacture of chromiferous azo-dyestuffs from mixtures of chromed azo-dyestuffs and chromable azo-dyestuffs which mixtures contain a chromium compound of the azo-dyestuff of the formula

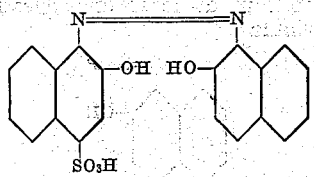

as well as the same unchromed azo-dyestuff, consisting in boiling these mixtures for at least four hours in an aqueous medium and in the absence of free acids with sodium acetate.

10. Chromiferous azo-dyestuffs, obtained from mixtures of chromed azo-dyestuffs and chromable azo-dyestuffs, which mixtures contain at least one dyestuff of the general formula

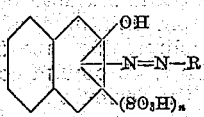

wherein the hydroxyl- and the azo-group are in ortho-position to each other, and wherein $n$ equals 1 to 3, and R is a naphthol radical, by boiling these mixtures for at least four hours in an aqueous medium and in the absence of free acids with alkali-forming metal salts which are at the most slightly hydrolyzed in aqueous solution, which products represent dark colored powders easily soluble in water and dyeing wool various tints of very good fastness.

11. Chromiferous azo-dyestuffs, obtained from mixtures of chromed azo-dyestuffs and chromable azo-dyestuffs, which mixtures contain at least one chromium compound of an azo-dyestuff of the general formula

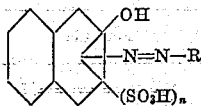

wherein the hydroxyl- and the azo-group are in ortho-position to each other, and wherein $n$ equals 1 to 3, and R is a naphthol radical, by boiling these mixtures for at least four hours in an aqueous medium and in the absence of free acids with alkali-forming metal salts which are at the most slightly hydrolyzed in aqueous solution, which products represent dark colored powders easily soluble in water and dyeing wool various tints of very good fastness.

12. Chromiferous azo-dyestuffs, obtained from mixtures of chromed azo-dyestuffs and chromable azo-dyestuffs, which mixtures contain at least one chromium compound of an azo-dyestuff of the general formula

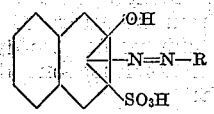

wherein the hydroxyl- and the azo-group are in ortho-position to each other, and wherein R is a naphthol radical, by boiling these mixtures for at least four hours in an aqueous medium and in the absence of free acids with alkali-forming metal salts which are at the most slightly hydrolyzed in aqueous solution, which products represent dark colored powders easily soluble in water and dyeing wool various tints of very good fastness.

13. Chromiferous azo-dyestuffs, obtained from mixtures of chromed azo-dyestuffs and chromable azo-dyestuffs, which mixtures contain a chromium compound of an azo-dyestuff of the general formula

wherein the hydroxyl- and azo-group are in ortho-position to each other, and wherein R is a naphthol radical, by boiling these mixtures for at least four hours in an aqueous medium and in the absence of free acids with alkili-forming metal salts which are at the most slightly hydrolyzed in aqueous solution, which products represent dark colored powders easily soluble in water and dyeing wool various tints of very good fastness.

14. Chromiferous azo-dyestuffs, obtained from mixtures of chromed azo-dyestuffs and chromable azo-dyestuffs, which mixtures contain a chromium compound of an azo-dyestuff of the general formula

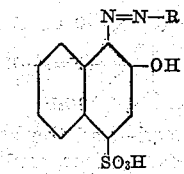

wherein R is a naphthol radical, by boiling these mixtures for at least four hours in an aqueous medium and in the absence of free acids with alkali-forming metal salts which are at the most slightly hydrolyzed in aqueous solution, which products represent dark colored powders easily soluble in water and dyeing wool various tints of very good fastness.

15. Chromiferous azo-dyestuffs, obtained from mixtures of chromed azo-dyestuffs and chromable azo-dyestuffs, which mixtures contain a chromium compound of the azo-dyestuff of the formula

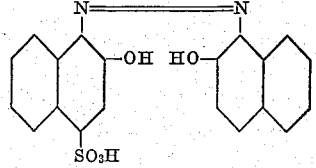

by boiling these mixtures for at least four hours in an aqueous medium and in the absence of free acids with alkali-forming metal salts which are at the most slightly hydrolyzed in aqueous solution, which products represent dark colored powders easily soluble in water and dyeing wool various tints of very good fastness.

16. Chromiferous azo-dyestuffs, obtained from mixtures of chromed azo-dyestuffs and chromable azo-dyestuffs, which mixtures contain a chromium compound of the azo-dyestuff of the formula

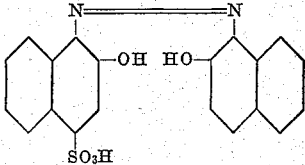

as well as the same unchromed azo-dyestuff, by boiling these mixtures for at least four hours in an aqueous medium and in the absence of free acids with alkali-forming metal salts which are at the most slightly hydrolyzed in aqueous solution, which products represent dark colored powders easily soluble in water and dyeing wool blue to navy blue tints of very good fastness, particularly to rubbing, and excellent color in the artificial light.

17. Chromiferous azo-dyestuffs, obtained from mixtures of chromed azo-dyestuffs and chromable azo-dyestuffs, which mixtures contain a chromium compound of the azo-dyestuff of the formula

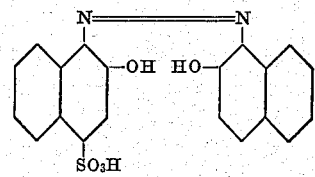

as well as the same unchromed azo-dyestuff, by boiling these mixtures for at least four hours in an aqueous medium and in the absence of free acids with an alkali-forming metal salt of an aliphatic acid, which products represent dark colored powders easily soluble in water and dyeing wool blue to navy blue tints of very good fastness, particularly to rubbing, and excellent color in the artificial light.

18. Chromiferous azo-dyestuffs, obtained from mixtures of chromed azo-dyestuffs and chromable azo-dyestuffs, which mixtures contain a chromium compound of the azo-dyestuff of the formula

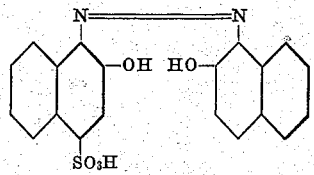

as well as the same unchromed azo-dyestuff, by boiling these mixtures for at least four hours in an aqueous medium and in the absence of free acids with sodium acetate, which products represent dark colored powders easily soluble in water and dyeing wool blue to navy blue tints of very good fastness, particularly to rubbing, and excellent color in the artificial light.

FRITZ STRAUB.
HERMANN SCHNEIDER.